US009361147B2

(12) United States Patent
Morariu et al.

(10) Patent No.: US 9,361,147 B2
(45) Date of Patent: Jun. 7, 2016

(54) GUEST CUSTOMIZATION

(71) Applicant: Hewlett Packard Enterprise Development LP, Houston, TX (US)

(72) Inventors: George Cristian Morariu, Cupertino, CA (US); Raghavendra Rachamadugu, Sunnyvale, CA (US); Benjamin Seth Heilers, Sunnyvale, CA (US); Haritha Koppala Nandela, Sunnyvale, CA (US); Michele Yoshikawa, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/622,454

(22) Filed: Feb. 13, 2015

(65) Prior Publication Data
US 2015/0178118 A1 Jun. 25, 2015

Related U.S. Application Data

(63) Continuation of application No. 13/563,069, filed on Jul. 31, 2012, now Pat. No. 8,990,806.

(51) Int. Cl.
*G06F 9/46* (2006.01)
*G06F 9/455* (2006.01)
*G06F 9/48* (2006.01)
*G06F 9/445* (2006.01)

(52) U.S. Cl.
CPC ........ *G06F 9/45558* (2013.01); *G06F 9/44505* (2013.01); *G06F 9/4881* (2013.01); *G06F 8/63* (2013.01); *G06F 9/45533* (2013.01); *G06F 2009/45562* (2013.01); *G06F 2009/45579* (2013.01); *G06F 2009/45583* (2013.01)

(58) Field of Classification Search
CPC .......................... G06F 9/50; G06F 2009/45579
See application file for complete search history.

(56) References Cited

U.S. PATENT DOCUMENTS

| | | | |
|---|---|---|---|
| 8,205,194 | B2 | 6/2012 | Fries et al. |
| 2006/0212695 | A1 | 9/2006 | Oguma |
| 2007/0101323 | A1 | 5/2007 | Foley et al. |
| 2008/0104588 | A1 | 5/2008 | Barber et al. |
| 2009/0077551 | A1 | 3/2009 | Whiteley |
| 2010/0122052 | A1 | 5/2010 | Waldspurger et al. |
| 2010/0235831 | A1 | 9/2010 | Dittmer |
| 2011/0173605 | A1 | 7/2011 | Bourne |
| 2012/0054736 | A1 | 3/2012 | Arcese et al. |
| 2014/0019772 | A1 * | 1/2014 | Sudhakar ............ H04L 63/0823 713/189 |

OTHER PUBLICATIONS

Padmanabh, G.; "Massive VM Provisioning in the Cloud"; May 26, 2011; http://www.doublecloud.org/wp-content/uploads/2011/05/GiridharPadmanabhMassiveVMF.

* cited by examiner

*Primary Examiner* — Comquy Truong
(74) *Attorney, Agent, or Firm* — Law Firm of Timothy Myers

(57) ABSTRACT

A system for guest customization includes a processor and a data storage device. A service operating system is stored on the data storage device that, when executed by the processor, boots a virtual machine into maintenance mode. A response file creation module is stored on the storage device that, when executed by the processor, creates a response file. A customization agent is embedded within the service operating system that when executed by the processor on its startup, automatically performs customizations based on the response file including at least one of including adding or removing files within the data storage device and injecting main operating system or virtual machine agent startup scripts to complete customization once the virtual machine is rebooted into the main operating system.

20 Claims, 9 Drawing Sheets

GUEST CUSTOMIZATION

CROSS-REFERENCE TO RELATED APPLICATIONS

This application claims priority to and is a continuation of commonly assigned U.S. Ser. No. 13/563,069, filed 31 Jul. 2012, now U.S. Pat. No. 8,990,806, entitled "CUSTOMIZED VIRTUAL MACHINE CREATION", which is hereby incorporated by reference.

BACKGROUND

Within information technology systems, a situation can occur in data centers where a disproportionate number of physical machines such as servers are running at very low rates of usage. This situation wastes the data center's resources such as, for example, power, cooling and space, as well as the internal resources of each server such as CPU cycles, memory, and storage. This situation is called server sprawl. Various techniques exist to mitigate server sprawl; most notably computer virtualization. A virtual machine (VM) is a software implementation of a computing device that executes programs like a physical machine.

One characteristic of a VM is that the software running inside is limited to the resources and abstractions provided by the VM, and the VM cannot break out of its virtual environment. In a virtualized data center, new virtual computer systems are often created from an existing gold standard virtual computer system called an image or VM template by an operation known as "clone," "deploy," or "instantiate." The source VM is a combination of operating system, applications, and the entire associated configuration. However, in some situations and for various reasons, it is necessary to customize the configuration of a newly created VM on a per-VM-deployment basis.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
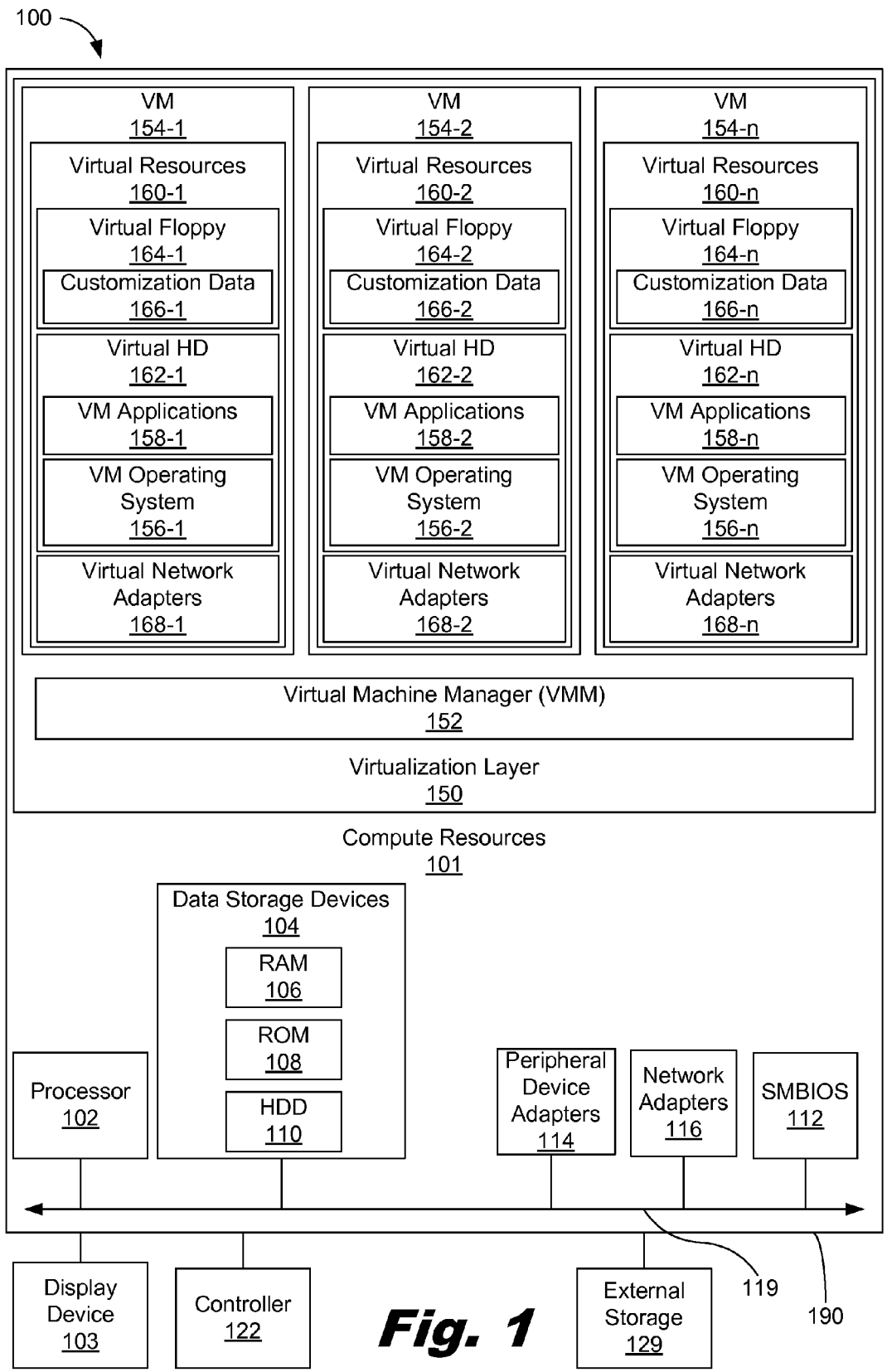
FIG. 1 is a block diagram of a number of VMs within a computing system, according to one example of the principles described herein.

The present systems and methods describe a method of creating a customized virtual machine comprising, with a processor, booting a virtual machine into a service operating system, with an in-built customization agent, customizing a main operating system while the virtual machine is in maintenance mode, and rebooting the virtual machine into the main operating system of the virtual machine.

The present systems and methods further describe a system for cloning a virtual machine comprising a processor, a data storage device communicatively coupled to the processor, a response file creation module stored on the storage device that, when executed, causes the processor to create a response file containing a number of virtual machine operating system customizations, and a service operating system stored on the data storage device that, when executed, causes the processor to boot the virtual machine into maintenance mode, in which the system utilizes a response file created by the response file creation module to customize a number of parameters of an virtual machine operating system while a virtual machine is in maintenance mode The present systems and methods further describe a computer program product for creating a customized virtual machine, the computer program product comprising a computer readable storage medium comprising computer usable program code embodied therewith, the computer usable program code comprising computer usable program code to, when executed by a processor, boot a virtual machine into a service operating system, and computer usable program code to, when executed by a processor, customize a main virtual operating system while the virtual machine is in maintenance mode.

The present systems and methods provide an automated, vendor independent, and extensible mechanism to perform customizations within a new or cloned VM. For example, the presented systems and methods also solve the problem of creating a brand new virtual computer system to be configured with static IP settings. Further, the present system and methods customize the configuration of the VM, and, more specifically, the configuration of the offline, main OS without actually booting the VM into the main OS. Thus, the present systems and methods prevent booting into the main OS of a VM prior to customization which may otherwise result in unintended consequences such as, for example, IP conflicts.

When creating a new VM from an existing VM, the network adapters lose their configuration in some operating systems due to the different Media Access Control (MAC) addresses generated for the new VM. This effectively denies any network access to and from the newly created VM. In this situation, in order to provide network connectivity, administrators manually connect to the VM's console using virtualization software, and reconfigure the network adapters. Alternatively, the administrators make use of virtualization vendor-supported means such as a guest OS customization utility used to customize the operating system (OS) utilized by the new VM. However, this guest OS customization utility may not be comprehensive across all possible guest operating systems. Further, the guest OS customization utility is not extensible or modifiable by the administrator. Still further, guest OS customization utility is specific to that virtualization vendor and does not work with other virtualization vendor technologies.

In addition to the above, when creating a new VM from an existing VM that has a static internet protocol (IP) configuration on the network adapters, the new VM may create IP conflicts on the network if brought up on the same network as the source VM. IP conflicts result in disrupting services offered by other servers running on the network, and the resulting problem(s) are very hard to diagnose. Previously, as described above, administrators manually connect to the VM's console using virtualization software, and reconfigure the network adapters in order to overcome the IP conflict. However, administrators doing this manually must follow a carefully thought through sequence of steps to avoid chances of IP conflicts and unknowingly causing service disruption of potentially unrelated servers. Administrators require in-depth knowledge of configuring networks on each individual operating system. Therefore, for this additional reason, manual reconfiguration of the network adapters is time consuming and can introduce unintended errors.

In addition to the above, when creating a new VM from an existing VM that has a dynamic host configuration protocol (DHCP) enabled network adapters, the new VM will not have network connectivity when brought up on a network without a DHCP network configuration protocol. To remedy this situation, administrators manually connect to the VM's console using virtualization software, and reconfigure the network adapters to establish network connectivity. For example, a static IP configuration may be provided. In another example, a new DHCP server may be installed on the network.

In addition to the above, when creating a new VM from an existing VM, the new VM does not function properly due to the changes needed for the configuration inherited from the source VM. For example, the new instance of the OS running in the new VM needs to be registered with OS vendor for licensing purposes. Otherwise, the server will cease to run after a certain grace period. Another example of changes that are needed before the VM functions properly is that a number of applications running on the VM including the OS itself may have statically generated instance IDs or other configuration pieces that need to be updated or regenerated when they are reincarnated in the image transferred to a new computer system. As described above, an administrator must manually reconfigure the new VM's configurations inherited from the source VM.

As pertaining to all the above, in the context of instantiating a new image in a cloud computing or Infrastructure-as-a-Service (IaaS) environment, new VMs are created based on pre-existing and well-prepared gold images. This creates a situation within a cloud computing or IaaS environment that suffers from the same deficiencies as described above.

In addition to the above, creating several brand new VMs to be configured with specific IP settings is a manual process often involving entering of IP settings and other details on each VM. In this situation, administrators have to manually connect to the VM's console, and configure the network adapters based on the specifics of the OS in question. This is a manual operation, and is not scalable. Further, virtualization vendors offer little or no support regarding this problem. Similarly, reconfiguring several VMs with new IP settings or other configuration changes is a manual process often involving individually connecting to the VMs' consoles and manually configuring each VM.

In addition to the above, the overall process of guest customization can be used by itself in a standalone context that is outside of any clone operation. Hence, this is generally useful to change configuration of guest operating system and/or its applications.

The VM once brought into "maintenance mode" has access to reconstituted file systems of the main operating system. The "maintenance mode" offers a unique and powerful opportunity to solve variety of use cases. In one example, contents of hard-disk can be altered without activating the main operating system or any applications present on the main operating system. In this example, an administrator may wish to add a new file to a particular location on the disk or remove a file infected with virus and such operations may not be possible while the main operating system is active.

As used in the present specification and in the appended claims, the term "virtual machine" is meant to be understood broadly as any instance of a data-processing system that appears to be at the exclusive disposal of a single user, but whose functions are accomplished by sharing the resources of a physical data-processing system. In one example, a virtual machine (VM) may be a software implementation of a machine that executes programs like a non-virtual, real machine. In this example, the VM utilizes software emulation, hardware virtualization, or both to achieve the virtual environment. Further, in another example, multiple virtual machines can share a common set of physical resources.

Further, as used in the present specification and in the appended claims, the term "image" is meant to be understood broadly as any off-line specification of the virtual hardware that makes up the virtual machine along with all the data utilized by the virtual machine such as, for example, the operating system and applications run by the virtual machine.

Still further, as used in the present specification and in the appended claims, the term "maintenance mode" is meant to be understood broadly as a specific operating environment, such as an execution environment or runtime, provided by a bootable media in which the media is typically light weight and the runtime offers less functionality than a full version of an operating system. A characteristic of maintenance mode is that the entire operating system and all applications reside only in RAM and do not use any data storage devices such as hard disks. In some instances, maintenance mode may be referred to as rescue mode.

Additionally, as used in the present specification and in the appended claims, the terms "Service OS" or "SOS" are meant to be understood broadly as any media that boots a VM into maintenance mode. For example, the SOS may be a pre-boot operating system that provides a framework to execute commands on a VM and may include access to persistent data associated with a main, offline operating system if this enhanced support has been added to the service OS. Examples would include Windows Pre-boot Execution Image and Linux Stage 2 Image, among others. In one example, maintenance mode provides access to an offline, main operating system's persistent data without booting into the main operating system. In one example, this may be achieved through use of a custom built or vendor-provided service OS. In the example employing the vendor-provided service OS, the vendor-provided service OS may or may not be customized by the present systems and methods to achieve the functionality described herein.

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

FIG. 1 is a diagram of a system (100) including a number of VMs (154-1, 154-2, 154-n) within a computing system (190) according to one example of the principles described herein. Referring to FIG. 1, system (100) comprises host machine compute resources (101), a controller (122), and external storage (129). The compute resources (101) may comprise a number of processors (102), a number of data storages devices (104), a system management basic input/output system (SMBIOS) (112), a number of peripheral device adapters (114), and a number of network adapters (116). Further, at certain points within the present methods, a service OS (SOS) (FIG. 3, 320) and a customization agent (FIG. 3, 322) may be created or otherwise provided. These hardware components may be interconnected through the use of a number of busses and/or network connections. In one example, the processor (102), data storages device (104), SMBIOS (112), peripheral device adapters (114), network adapters (116) are communicatively coupled via bus (119). Each of the compute resources (101) will now be described in more detail.

The processor (102) may include the hardware architecture for retrieving executable code from the data storage device (104) and executing the executable code. The executable code, when executed by the processor (102), causes the processor (102) to implement at least the functionality of virtual machine creation and management. In the course of executing code, the processor (102) may receive input from and provide output to a number of the remaining hardware units. In one example, the compute resources (101) may further comprise a display device (103) for displaying user interactive text and images so that a user may instruct the compute resources (101) to perform at least the above functionality of the processor (102).

The data storage device (104) of the compute resources (101), may store data such as executable code. This executable code is processed and produced by the processor (102). The data storage device (104) may include various types of memory devices, including volatile and nonvolatile memory. For example, the data storage device (104) of the present example may include Random Access Memory (RAM) (106), Read Only Memory (ROM) (108), and Hard Disk Drive (HDD) memory (110), among others. The present specification contemplates the use of many varying type(s) of memory in the data storage device (104) as may suit a particular application of the principles described herein. In certain examples, different types of memory in the data storage device (104) may be used for different data storage needs. In certain examples, the processor (102) may boot from the Read Only Memory (ROM) (108), maintain nonvolatile storage in the Hard Disk Drive (HDD) memory (110), and execute program code stored in Random Access Memory (RAM) (106).

Generally, the data storage device (104) may comprise a computer readable storage medium. For example, the data storage device (104) may be, but not limited to, an electronic, magnetic, optical, electromagnetic, infrared, or semiconductor system, apparatus, or device, or any suitable combination of the foregoing. More specific examples of the computer readable storage medium may include, for example, the following: a portable computer diskette, a hard disk, a random access memory (RAM), a read-only memory (ROM), an erasable programmable read-only memory (EPROM), flash memory, byte-addressable non-volatile memory (phase change memory, memristors), a portable compact disc read-only memory (CD-ROM), an optical storage device, a magnetic storage device, or any suitable combination of the foregoing, among others. In the context of this document, a computer readable storage medium may be any tangible medium that can contain, or store a program or any data for use by or in connection with an instruction execution system, apparatus, or device.

The network adapters (116) of the compute resources (101) provide the compute resources (101) with connectivity to a network. Although one network adapter (110) is shown in FIG. 1, any number of network adapters (110) may be present within the system (100). The compute resources (101) are able to communicate with other computing devices via the network adapter (110). The network adapter (110) may employ a data link layer standard such as, for example, Ethernet or Wi-Fi, among others, in order to transfer data using wired communications, wireless communications, or a combination thereof.

The peripheral device adapter (114) of the compute resources (101) enables the processor (102) of the compute resources (101) to interface with various other hardware elements, external and internal to the compute resources (101). For example, the peripheral device adapter (114) may provide an interface to input/output devices, such as, for example, the display device (103), an external storage device, a keyboard, touch screen displays, and a mouse, among others, to create a user interface and/or access external sources of memory storage, for example. The SMBIOS (112) of the compute resources (101) defines data structures and access methods in BIOS which allows a user or application to store and retrieve information specifically about the system (100).

The system (100) may comprise a virtualization layer (150) that executes on the compute resources (101). In one example, the virtualization layer (150) is a combination of hardware and software comprising logic such as, for example, drivers and input/output stacks that enable the system (100) to instantiate a number of VMs and manage the underlying compute resources (101) to enable the VMs to utilize the resources virtually.

Within the virtualization layer (150), a virtual machine manager (VMM) (152) manages a number of VMs (154-1, 154-2, 154-n). The VMM may be any type of hypervisor that allows a number of virtual operating systems, called guests, to run concurrently on the system (100). In one example, the VMM (152) may create, edit, start or stop the VMs (154-1, 154-2, 154-n). In another example, the VMM (152) may view and control each VMs' (154-1, 154-2, 154-n) console, and display to a user performance and utilization statistics for each VM (154-1, 154-2, 154-n). Each of the VMs (154-1, 154-2, 154-n) comprises a VM operating system (156-1, 156-2, 156-n) and a number of VM applications (158-1, 158-2, 158-n) among the virtual resources (160-1, 160-2, 160-n) within the VMs (154-1, 154-2, 154-n).

The system (100) may further comprise a controller (122). The controller (122) is a piece of software running on any computing device comprising a processor and memory that executes code. In one example, the controller (122) executes a software package such as, for example, a Hewlett-Packard (HP) server automation (SA) that assists in the creation of new virtual computer systems or VMs within the system (100) by customizing the OS of a vendor such as, for example, WINDOWS® operating system developed and sold by Microsoft Corporation, or OS X® operating system developed sold by Apple Inc., among many others. Other non-windows system programs such as UNIX®, LINUX®, MS-DOS®, and SOLARIS® operating system owned by Oracle Corporation among many other operating systems may also be customized utilizing the systems and methods of the present specification.

In the example of FIG. 1, the controller (122) is located outside the computing system (190). In this example, the controller (122) may be implemented by a third party as a service to the owner of the computing system (190). In another example where the controller (122) is located outside the computing system (190), the controller (122) may be implemented by an administrator of the computing system (190). In still another example, the controller (122) may be stored in the data storage device (104) of the computer resources (101) and executed by the processor (102), In one example, the controller (122) may provide the above services to any number of computing systems like that of computing system (190).

In still another example, the controller (122) may be stored in or communicatively coupled directly or indirectly to the computing system (190). However, in this example and all the above examples, the controller (122) may be utilized to enhance and manage the functions of the SOS (FIG. 3, 320) and customization agent as an overarching software execution element.

The system (100) may further comprise an external storage (129). In one example, the external storage (129) refers to any storage provider residing outside of the system (100) such as a Storage Area Network (SAN), a Network Attached Storage (NAS), or a Network File System Server (NFS), among others.

The virtual resources (160-1, 160-2, 160-n) may comprise, for example, a number of virtual hard drives (HD) (162-1, 162-2, 162-n) and a number of virtual floppy drives (164-1, 164-2, 164-n). The virtual hard drives (HD) (162-1, 162-2, 162-n) are devices within the VMs (154-1, 154-2, 154-n) that appear to a user as a separate entity. In one example, this separate entity may be a shared portion of a real device such as, for example, the Hard Disk Drive (HDD) (110) of the data storage device (104) of the compute resources (101) of which the VMs (154-1, 154-2, 154-n) share the resources thereof. Although only three VMs (154-1, 154-2, 154-n) are depicted in FIG. 1, any number of VMs may exist within the virtualization layer (150).

In one example, the VM operating system (156-1, 156-2, 156-n) of each VM (154-1, 154-2, 154-n) is stored on the virtual hard drives (HD) (162-1, 162-2, 162-n) of their respective virtual resources (160-1, 160-2, 160-n). In another example, the VM applications (158-1, 158-2, 158-n) are stored on the virtual hard drives (HD) (162-1, 162-2, 162-n) of their respective virtual resources (160-1, 160-2, 160-n).

In one example, the virtual floppy drives (164-1, 164-2, 164-n) contain customization data (166-1, 166-2, 166-n) that the customization agent (FIG. 3, 322) uses to customize an instance of a VM (154-1, 154-2, 154-n). In one example, the customization data (166-1, 166-2, 166-n) contained within the virtual floppy drives (164-1, 164-2, 164-n) comprise a 1.4 MB virtual floppy drive file. In this example, virtualization products such as those developed and sold by VMware, Inc. or Microsoft Corporation can read this customization data (166-1, 166-2, 166-n). As will be described in more detail below, the customization agent (FIG. 3, 322) searches for the response file in any data storage devices such as virtual floppy drives (164-1, 164-2, 164-n) and their contents when the VM (154-1, 154-2, 154-n) is in maintenance mode using a response file searching module (324) of the customization agent (FIG. 3, 322) of FIG. 3. In one example, the virtual floppy drives (164-1, 164-2, 164-n) comprise all the data needed to customize the VMs (154-1, 154-2, 154-n) within the response file (232) created by the response file creation module (230). In another example, the virtual floppy drives (164-1, 164-2, 164-n) comprise a portion of the data needed to customize the VMs (154-1, 154-2, 154-n).

In one example, VMs (154-1, 154-2, 154-n) executing on the system (100) may instantiate different operating systems. For example, VM (154-1) may instantiate a UNIX® operating system developed by AT&T employees at Bell Labs, while VM (154-2) may instantiate a WINDOWS® operating system developed and owned by Microsoft Corporation. The compute resources (101) are managed by the virtual machine manager (152) to provide each VM (154-1, 154-2, 154-n) with virtual resources (160-1, 160-2, 160-n). Thus, the virtual resources (160-1, 160-2, 160-n) may be modified dynamically to compensate for changes in the operating environment of each virtual machine (154-1, 154-2, 154-n).

The virtual resources (160-1, 160-2, 160-n) may further comprise a number of virtual network adapters (168-1, 168-2, 168-n). Thus, the VMs (154-1, 154-2, 154-n) are able to communicate with other computing devices via the virtual network adapters (168-1, 168-2, 168-n). The virtual network adapters (168-1, 168-2, 168-n) provide each VM (154-1, 154-2, 154-n) with connectivity to a network such as an internet and an intranet, among other networks.

In one example, the system (100) exposes configuration data to the VMs (154-1, 154-2, 154-n) operating on the system (100). In one example, virtual machine manager (152) further extracts configuration data pertaining to the compute resources (101) from the system (100) and store the configuration data as hardware/identification data, for example in a secure storage area. In another example, the logic to expose configuration data to VM (154-1, 154-2, 154-n) operating on the system (100) may be implemented in a service console separate from the virtual machine manager (152).

The system (100) of the present application may be used in various different environments. The system may be used in environments where highly reliable, available, scalable, fast, and energy-efficient key-value stores are useful. For example, the system (100) may be used in server or cloud services and may complement these services with robust query execution techniques that encompass traditional join and aggregation methods as well as extensible map-reduce operations.

Figure 2:
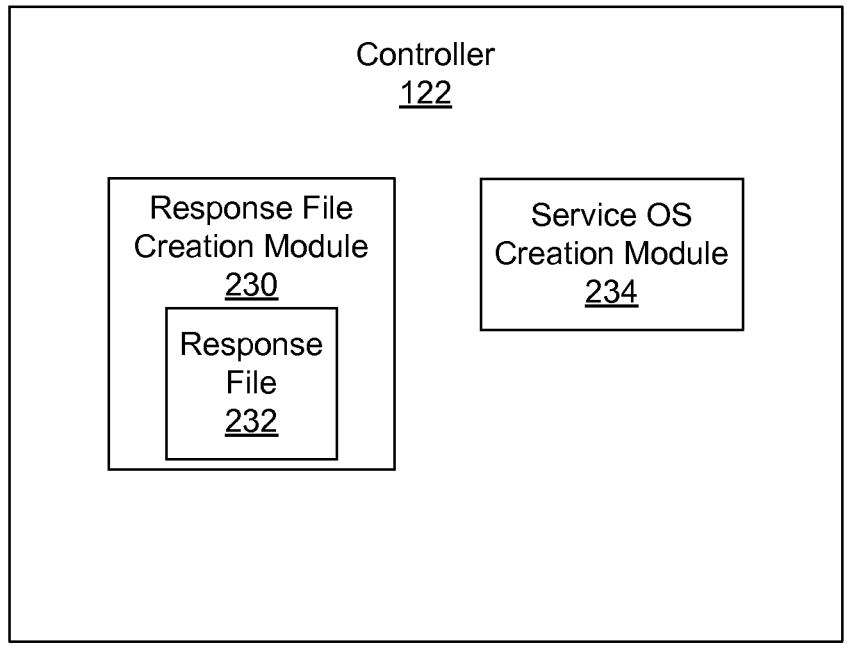
FIG. 2 is a block diagram of the controller of FIG. 1, according to one example of the principles described herein.

FIG. 2 is a block diagram of the controller (122) of FIG. 1, according to one example of the principles described herein. FIG. 2 shows a possible set of components that may comprise a controller (122) shown in FIG. 1. Controller (122) may comprise a response file creation module (230). The response file creation module (230) packages the customization input into a floppy image file that can be loaded onto the VM's virtual floppy disk drive. The response file image created is indicated by 232.

The response file creation module (230) creates a response file (232) that contains a number of parameters of the VM operating systems (156-1, 156-2, 156-n) that are to be changed within the VM operating systems (156-1, 156-2, 156-n) after cloning of the VMs (154-1, 154-2, 154-n). Thus, the response file (232) that the response file creation module (230) creates is data associated with the alteration of parameters such as, for example, IP settings, IP addresses, administrative passwords, VM identification numbers, hardware identification numbers, product keys, license keys, media access control (MAC) addresses, languages, keyboard layouts, universal resource locators (URL) of a number of tracking websites, among many other parameters.

The controller (122) may also comprise a service OS creation module (234) that dynamically creates service OS ISO files with in-built customization input. In this manner, the service OS creation module (234) obviates the need to supply even the bootstrap customization input through a means such as a virtual floppy drive (164-1, 164-2, 164-n).

Controller (122) may be made up of a number of other components that are specific to the implementation and the scenarios that are being addressed. These other components are not shown for brevity. One example of a controller is HP Server Automation product's core component. In one example, the controller (122) may be deployed on one or more physical or virtual computers that are not necessarily part of the computing system (190) that is hosting the VMs to be customized.

Figure 3:
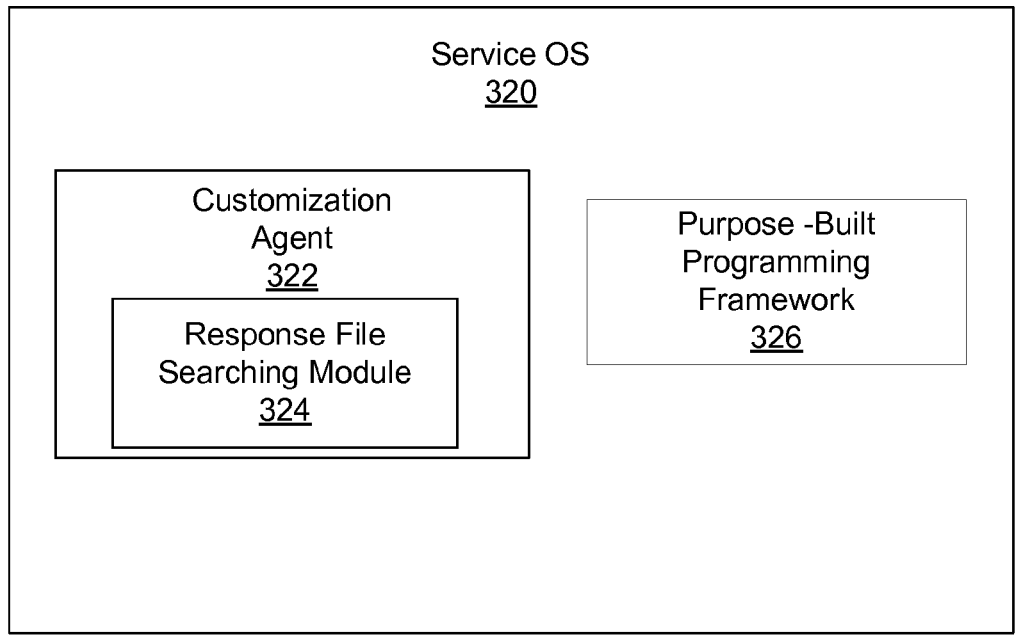
FIG. 3 is a block diagram of a service OS created by the service OS creation module (234) of FIG. 2, according to one example of the principles described herein.

FIG. 3 is a block diagram of a service operating system (OS) (320) created by the service OS creation module (234) of FIG. 2, according to one example of the presented invention The customization agent (322) and the response file searching module (324) within the customization agent (322) are described in detail in describing other figures below.

The SOS (320) may further comprise purpose-built application programming framework (326). The purpose-built application programming framework (326) may be a collection of utility methods that are specific to the use case. In one example, such as customizing a cloned VM (154-n), the framework provides utilities such as access to a VM's (154-1, 154-2, 154-n) offline operating system persistent data, and a common abstraction layer for accessing functionality such as OS startup script injection. One example of a programming framework (326) is the powerful Opsware Global File System feature of HP Server Automation (SA) product.

Figure 4:
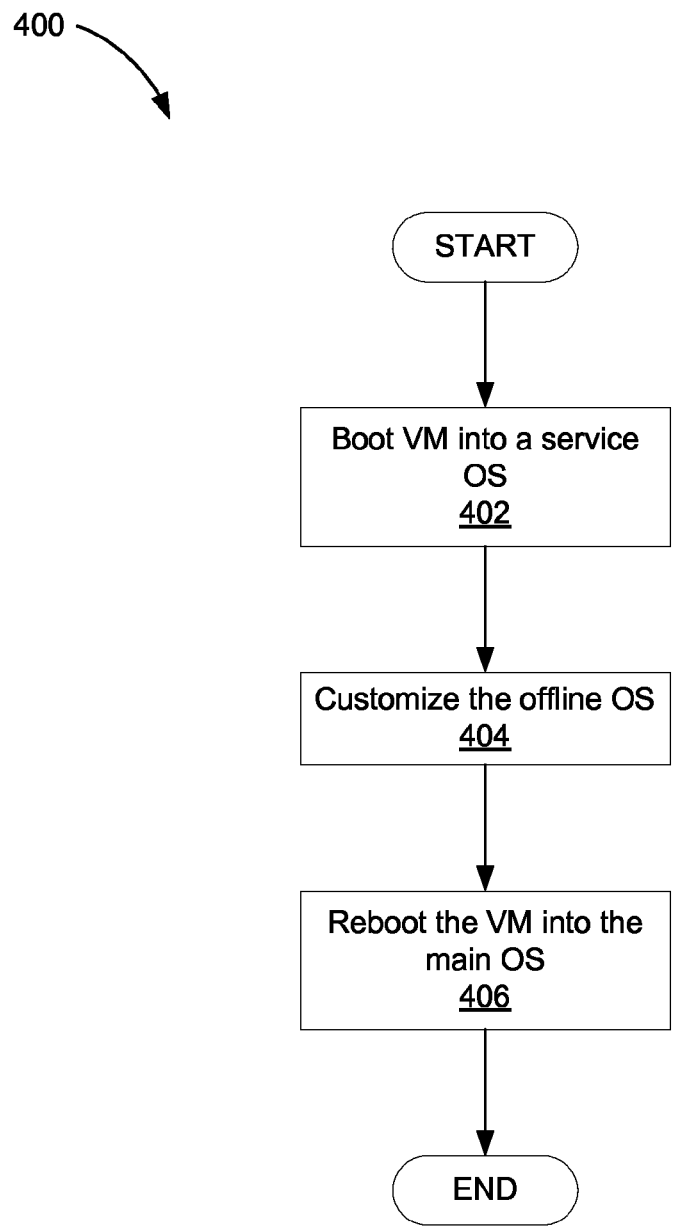
FIG. 4 is a flowchart showing a VM cloning method with the customization of VM operating system and other applications, according to one example of the principles described herein.

FIG. 4 is a flowchart showing a VM cloning method using the SOS (FIG. 3, 320) and the customization agent (FIG. 3, 322) of FIG. 1, according to one example of the principles described herein. The VM cloning method (400) may begin by booting (block 402) a VM (154-1, 154-2, 154-n) into a customized or unaltered service operating system (SOS). The offline main VM operating system (156-1, 156-2, 156-n) is customized (block 404) by, for example, the customization agent (FIG. 3, 322) among other ways possible within the system (100) using the response file (FIG. 2, 232). The overarching software, for example, the controller (122) which oversees the customization flow and orchestrates the different actors, then reboots (block 406) the VM (154-1, 154-2, 154-n) into the main OS of the VM (154-1, 154-2, 154-n). Each of the blocks within FIG. 2 comprises a number of sub-processes that bring about the automation of VM OS configuration. These sub-processes will now be described in more detail in association with FIGS. 5 through 8.

Figure 5:
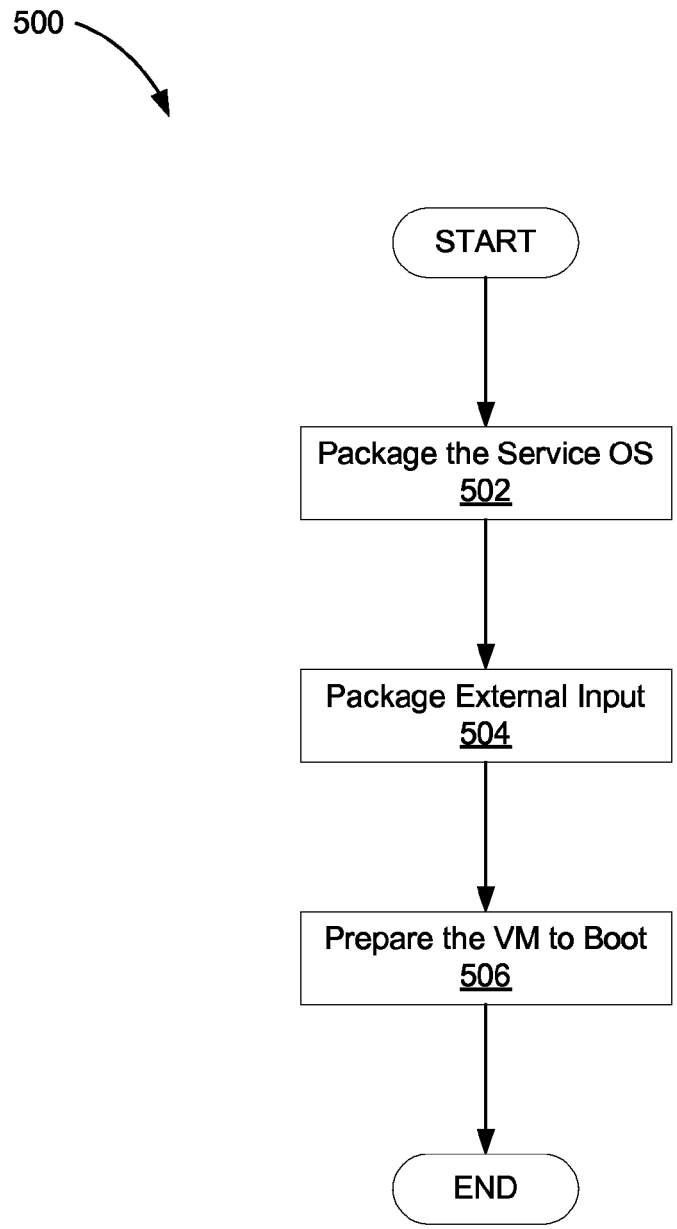
FIG. 5 is a flowchart showing a method of booting a VM into a customized service OS using the system of FIG. 1, according to one example of the principles described herein.

FIG. 5 is a flowchart (500) showing a method of booting into a customized service OS using the system (100) of FIG. 1, according to one example of the principles described herein. The method of FIG. 5 allows for the optional customization of a OS-vendor-provided service operating system in a way to provide a framework (326) to execute commands on the VM operating system (156-1, 156-2, 156-n) including access to the main VM operating system's (156-1, 156-2, 156-n) persistent data. Further, the method of FIG. 5 also allows for an automated method of booting a VM (154-1, 154-2, 154-n) into an SOS (FIG. 3, 320), that can be used for any purpose. A cloning scenario is presented herein. However, the method of FIG. 5 may be used in any scenario, and is not restricted to the cloning scenario presented herein.

Still further, the method (500) of FIG. 5 provides bootstrap input to the SOS (FIG. 3, 320) to implement use case specific behavior. In one example, the SOS (FIG. 3, 320) may take the internet protocol (IP) settings from the response file (FIG. 2, 232) stored within non-volatile storage devices embodied in a form such as the virtual floppy drives (164-1, 164-2, 164-n) to automatically configure the virtual network adapters (168-1, 168-2, 168-n) on the SOS (FIG. 3, 320) startup. In one example, the automatic configuration of the virtual network adapters (168-1, 168-2, 168-n) is performed at the startup. In this manner, the VM operating system (156-1, 156-2, 156-n) is made accessible for any network communication.

The method (500) of FIG. 5 is a possible way to cause the VM (154-1, 154-2, 154-n) to boot into maintenance mode via the SOS (FIG. 3, 320). Other methods may be used. The method of FIG. 5 may begin by packaging (block 502) the SOS (FIG. 3, 320) for use by the VM (154-1, 154-2, 154-n). In one example, the SOS (FIG. 3, 320) is packaged to an international organization for standardization (ISO) file to be used as CD backing on the VM (154-1, 154-2, 154-n). The SOS (FIG. 3, 320) may be customized in any way suitable to satisfy the needs of a particular use case. In one example, the customization agent (FIG. 3, 322) is injected or embedded into the SOS (FIG. 3, 320) as depicted in FIG. 3, and will serve as the focal point to receive any commands from the controller (122). In one example, the controller (122) uses the dynamically constructed SOS (FIG. 3, 320) ISO image to embed customization configurations as will be described in more detail below.

The method (500) of FIG. 5 proceeds by packaging (block 504) the external input to be supplied to the SOS (FIG. 3, 320) on startup. The external input may be referred to as a response file (FIG. 2, 232), and is created, as described above, by the response file creation module (230). In one example, the response file (232) may be stored in a text file and packaged into any non-volatile storage media such as, for example, the virtual floppy drives (164-1, 164-2, 164-n), virtual universal serial bus (USB) drives, and the virtual HD (162-1, 162-2, 162-n), among others. In another example, the response file (FIG. 2, 232) may be supplied using virtual COM ports (not shown in FIG. 1 for brevity).

In one example, the response file (FIG. 2, 232) supplied to the SOS (FIG. 3, 320) may comprise IP configuration of the virtual network adapters (168-1, 168-2, 168-n). In another example, the ISO file housing the SOS (FIG. 3, 320) may be dynamically built by injecting the external configuration input. This obviates the need for any additional channel of data transfer into the VM (154-1, 154-2, 154-n).

The method (500) of FIG. 5 continues by preparing (block 506) the VM (154-1, 154-2, 154-n) to boot according to a boot order. In one example, the boot order of the VM (154-1, 154-2, 154-n) may be changed to force the VM (154-1, 154-2, 154-n) to boot using the virtual CD ROM housing the ISO file. In this manner, the VM (154-1, 154-2, 154-n) is ready to perform any VM (154-1, 154-2, 154-n) customization as will be described below. In one example, a bootstrap configuration may be performed when the VM (154-1, 154-2, 154-n) starts up. For example, the customization agent (FIG. 3, 322) present in the SOS (FIG. 3, 320) can read the bootstrap input configuration and perform the appropriate startup actions. An example of a startup action is the configuration of the virtual network adapters (168-1, 168-2, 168-n) to allow the VM (154-1, 154-2, 154-n) to establish network connectivity.

Figure 6:
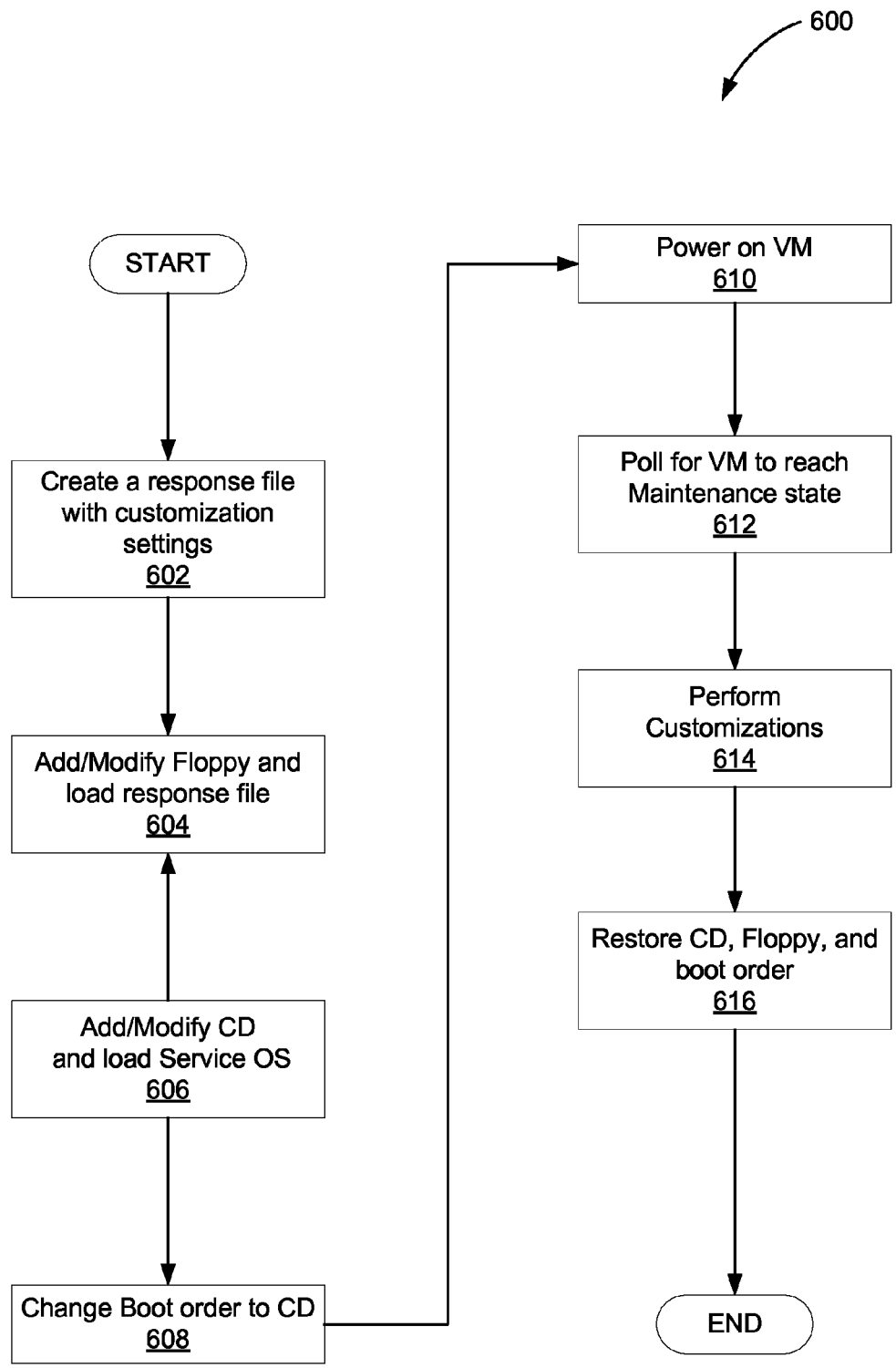
FIG. 6 is a flowchart showing a method of booting into a customized service OS using the system of FIG. 1, according to another example of the principles described herein.

FIG. 6 is a flowchart showing a method (600) of booting into a customized SOS (FIG. 3, 320) using the system of FIG. 1, according to another example of the principles described herein. FIG. 3 is a block diagram of the service OS (FIG. 3, 3224) of FIG. 1, according to one example of the principles described herein. The method (600) of FIG. 6 may begin by creating (block 602) a response file (FIG. 2, 232) comprising a number of customization settings for the main OS as described above.

The method (600) of FIG. 6 may proceed with the controller (122) preparing the response file (602), containing the customization settings, by creating (block 604) the floppy image comprising the response file and configuring the VM virtual floppy drive to load its contents from the created floppy image. The controller (122) adds (block 606) the CD backing and mounts the ISO file as described above in connection with block 502 of FIG. 3. In one example, the service OS creation module (FIG. 2, 234) of controller (122) creates the SOS (FIG. 3, 320), adds the CD backing, and mounts the ISO file. In this example, the service OS creation module (FIG. 2, 234) may add the CD backing, and mount the ISO file with or without customizing or otherwise changing a vendor-provided service OS. In another example, the service OS creation module (FIG. 2, 234) may dynamically build the SOS (FIG. 3, 320) by injecting the customization settings into the SOS ISO file.

In one example, the VM's (154-1, 154-2, 154-n) boot order may be changed. In the example of FIG. 6, the boot order is changed (block 608) to boot from the CD. In another example, the VM's (154-1, 154-2, 154-n) boot order may be changed based on application to a specific scenario or based on different virtualization vendors' specifications.

The method (600) of FIG. 6 proceeds by powering on (block 610) the VM (154-1, 154-2, 154-n). At block 612, controller (122) polls and waits for the customization agent on the VM (154-1, 154-2, 154-n) to communicate back to the controller. In this manner, the VM (154-1, 154-2, 154-n) is placed into maintenance mode to allow for customization of the main OS (156-1, 156-2, 156-n) as described at block 404 of FIG. 2. After the VM (154-1, 154-2, 154-n) is placed into maintenance mode, the controller (122)) may perform any needed configuration changes (block 614) and may restore (block 616) the CD, virtual floppy drives (164-1, 164-2, 164-n), and boot order. This places the VM (154-1, 154-2, 154-n) back into its original state before the method (600) of FIG. 6 was began.

Figure 7:
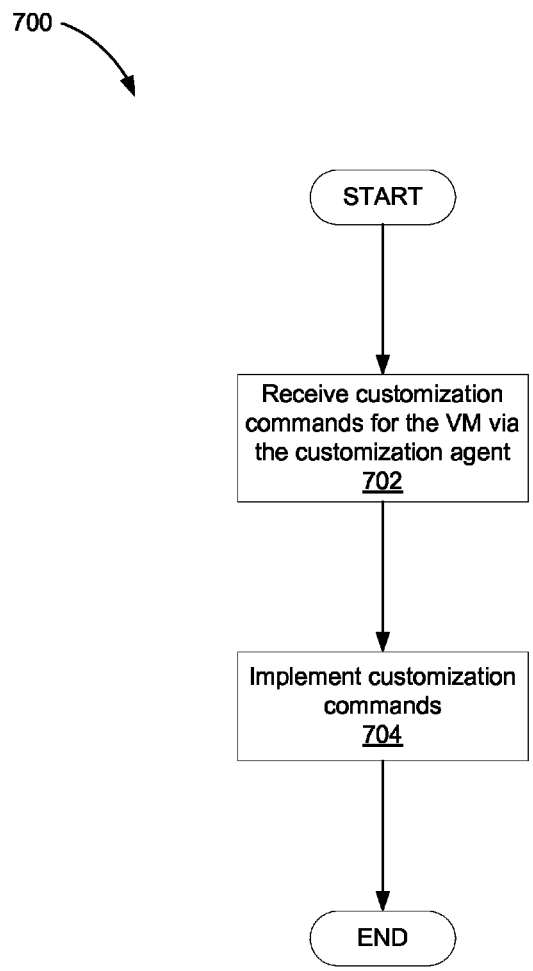
FIG. 7 is a flowchart showing a method of customizing a VM operating system using the system of FIG. 1, according to one example of the principles described herein.
Figure 9:
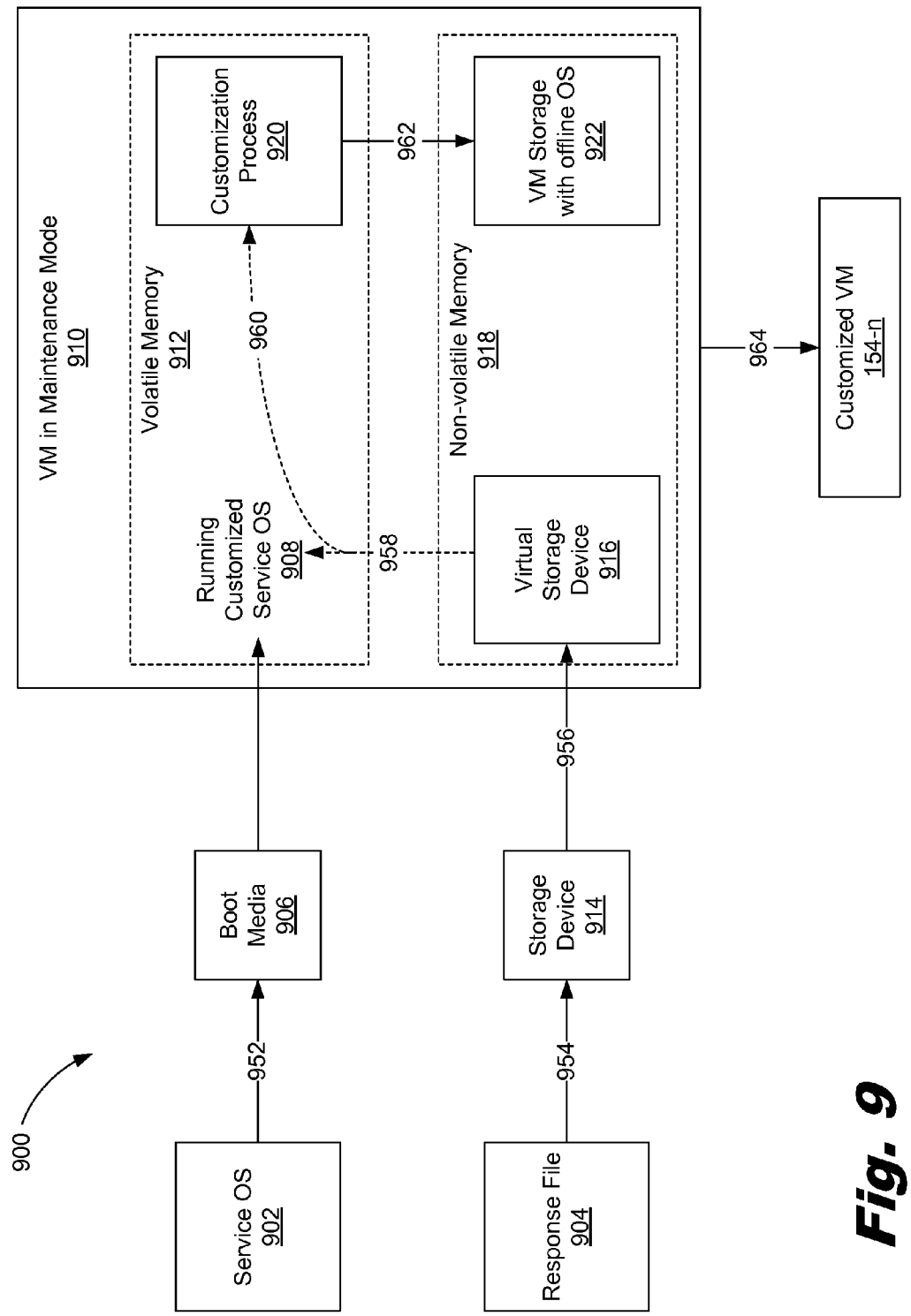
FIG. 9 is a data flow diagram depicting the process of customizing a VM, according to one example of the principles described herein.

Turning to the next figure, FIG. 7 is a flowchart showing a method (700) of customizing a VM operating system (156-1, 156-2, 156-n) using the system (100) of FIG. 1, according to one example of the principles described herein. A VM (154-1, 154-2, 154-n) that is booted into the SOS (FIG. 3, 320) and is in maintenance mode is ready for customization. The customization agent (FIG. 3, 322) may perform bootstrap configuration changes based on the response file (FIG. 2, 232) stored within a temporary virtual storage device (FIG. 9, 916). In addition, the VM (154-1, 154-2, 154-n) may receive (block 702) additional commands by virtue of the VM (154-1, 154-2, 154-n) running the customization agent (FIG. 3, 322). The commands are then implemented (block 704) to customize a number of parameters of the VM operating system (156-1, 156-2, 156-n) of the VM (154-1, 154-2, 154-n) or can do any action specific to the scenario.

In one example, the customization agent (FIG. 3, 322) is software that is controlled by the processor (FIG. 1, 102), and, by extension, a user such as the creator of the SOS (FIG. 3, 320) or an administrator. Through the use of, for example, Hewlett Packard's (HP) Server Automation (SA) Opsware Global File System (OGFS) agent as the overarching controller (122), a powerful operating environment is provided to allow for running of complex programs such as the customization agent (FIG. 3, 322) that can readily access offline disks and reconstituted file system structures. This is an example of building a framework (FIG. 3, 326) and providing a common software development kit (SDK) to facilitate easy application development in this environment.

In one example, customizing (block 702) network settings of the offline main OS (156-1, 156-2, 156-n) can be performed by injecting an OS startup script into the system partition of the offline main OS (156-1, 156-2, 156-n). In one example, the OS startup script can take input in the form of embedded configurations or a specific configuration file on disk such as the virtual hard drives (162-1, 162-2, 162-n).

Mechanics of injecting an SOS (FIG. 3, 320) startup script are specific to each OS (156-1, 156-2, 156-n) vendor and sometimes even vary between different versions of the same OS (156-1, 156-2, 156-n). Use of a virtual machine agent (158-1, 158-2, 158-n) in the main VM may offer a way to inject startup script to achieve OS vendor neutral logic of injecting a program that runs on OS startup. In one example, a VM (154-1, 154-2, 154-n) can have an HP SA agent installed, and an SA agent startup script can be injected to achieve OS vendor independence. The virtual machine agent is not explicitly shown in the FIG. 1 for brevity, but may be included as a VM application (158-1, 158-2, 158-n). The virtual machine agent may register itself as a daemon (e.g., a service) that is automatically started upon starting of the VM main operating system. Further, the virtual machine agent may itself have a notion of pluggable startup scripts that it executes during its startup providing a method to run a custom script upon OS startup in an OS vendor agnostic manner.

In another example, the customization agent (FIG. 3, 322) may be used to backup any persistent data in the cases of a non-functional main OS (156-1, 156-2, 156-n). In still another example, the customization agent (FIG. 3, 322) may be used to delete a virus preventing the booting and/or functioning of the main OS (156-1, 156-2, 156-n). In one example, the HP SA product may be sold or distributed with some out-of-the-box ready-to-use content to solve popular problems. In this example, a user may add any new content or modify the shipped content to suit their specific situation or circumstances. In still another example, the HP SA product may produce new ready-to-use content that is offered to a user or administrator in a market place such as, for example, HP Live Network available at https://hpln.hp.com/.

When implementing (block 704) changes to the VM operating system (156-1, 156-2, 156-n), the customization agent (FIG. 3, 322) accesses the virtual HD (162-1, 162-2, 162-n) or other virtual storage device where the VM operating system (156-1, 156-2, 156-n) is located. In this manner, the VM operating system (156-1, 156-2, 156-n) is changed while in a maintenance mode. In maintenance mode, the customization agent (FIG. 3, 322) may change a number of parameters or files within the main VM operating system (156-1, 156-2, 156-n) because the VM (154-1, 154-2, 154-n) was booted into maintenance mode via the customized SOS (FIG. 3, 320) described above. As described above, maintenance mode is a state of operation of the VM (154-1, 154-2, 154-n) where the VM (154-1, 154-2, 154-n) or applications that run thereon such as the main VM operating system (156-1, 156-2, 156-n) are not activated. In this state, the customized SOS (FIG. 3, 320) may mount the file system of the VM operating system (156-1, 156-2, 156-n), and all the files within the VM operating system (156-1, 156-2, 156-n) may be accessed, read, and changed. The customization agent (FIG. 3, 322) may also make use of the custom build programming framework (326) that is offered by creators of SOS (FIG. 3, 320) such as, for example, HP Server Automation (SA).

The VM (154-1, 154-2, 154-n) may receive (block 702) commands by virtue of the VM (154-1, 154-2, 154-n) running the customization agent (FIG. 3, 322). The commands may include, for example, commands to change the IP settings of the VM operating system (156-1, 156-2, 156-n) so that the virtual network adapters (168-1, 168-2, 168-n) may function without creating a conflict between instances of VM (154-1, 154-2, 154-n). Other parameters that may be changed via reception (block 702) and implementation (block 704) of customization commands include, for example, administrative passwords, IP addresses, VM identification numbers, hardware identification numbers, product keys, license keys, media access control (MAC) addresses, languages, keyboard layouts, universal resource locators (URL) of a number of tracking websites, among many other parameters.

In one example, changing IP settings may be performed before any other change so that the customization agent (FIG. 3, 322) may communicate via the virtual network adapters (168-1, 168-2, 168-n) of the VM (154-1, 154-2, 154-n). The reason the IP settings may be changed first is to provide network access so that the customization agent (FIG. 3, 322) may access information outside the VM (154-1, 154-2, 154-n) in order to further customize the VM operating system (156-1, 156-2, 156-n), for example. Thus, as described above, the customization agent (FIG. 3, 322) utilizes the virtual floppy drive (164-1, 164-2, 164-n). In this example, the virtual floppy drive (164-1, 164-2, 164-n) comprises network configuration data that assists the customization agent (FIG. 3, 322) in bootstrapping the network stack, and enabling access to a network.

Figure 8:
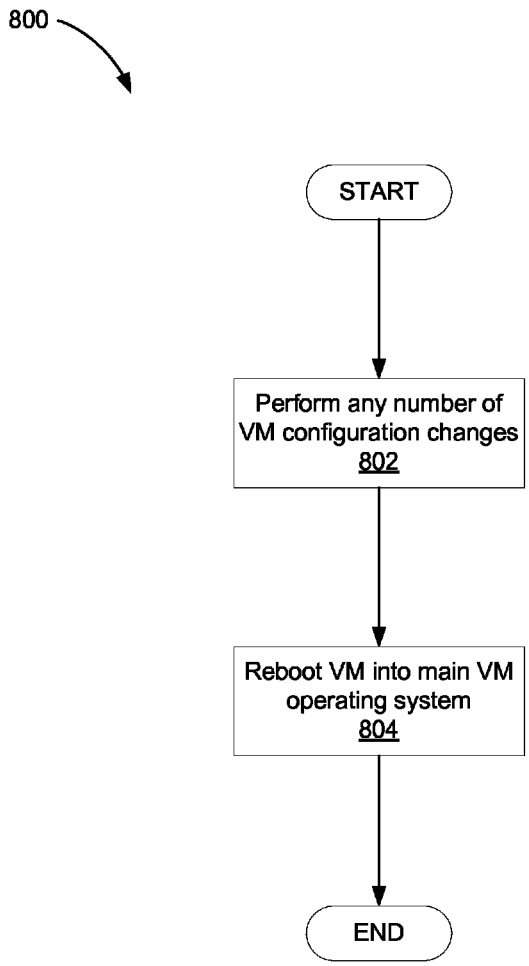
FIG. 8 is a flowchart showing a method of rebooting the VM into the main VM operating system using the system of FIG. 1, according to one example of the principles described herein.

FIG. 8 is a flowchart showing a method (800) of rebooting the VM (154-1, 154-2, 154-n) into the main VM operating system (156-1, 156-2, 156-n) using the system (100) of FIG. 1, according to one example of the principles described herein. The method (800) of FIG. 8 may proceed by performing (block 802) any number of VM configuration changes, and rebooting (block 804) the VM (154-1, 154-2, 154-n) into the main VM operating system (156-1, 156-2, 156-n). After a number of customizations are performed in maintenance mode as described above in connection with FIG. 7, the VM (154-1, 154-2, 154-n) is programmatically rebooted to boot back into the main VM operating system (156-1, 156-2, 156-n). Some VM configuration changes may be needed to force the VM (154-1, 154-2, 154-n) to boot back into main VM operating system (156-1, 156-2, 156-n). For example, the VM's (154-1, 154-2, 154-n) boot order may need to be adjusted. In some cases, special considerations are required to ensure the VM (154-1, 154-2, 154-n) does not come up with configurations inherited from source image or VM or VM template. For example, the virtual network adapters (168-1, 168-2, 168-n) may need to be disabled and/or disconnected before rebooting the VM (154-1, 154-2, 154-n) into main VM operating system (156-1, 156-2, 156-n), to ensure the VM (154-1, 154-2, 154-n) does not create an IP conflict.

In one example, customizations performed in maintenance mode result in special startup programs executing on VM main operating system (156-1, 156-2, 156-n) startup. For example, a startup script may have been injected into main VM operating system (156-1, 156-2, 156-n) that completes the intended customization of main VM operating system (156-1, 156-2, 156-n). Some changes may require the active VM main operating system (156-1, 156-2, 156-n) runtime environment, and, therefore, cannot be done in maintenance mode. Thus, additional changes to the VM operating system (156-1, 156-2, 156-n) may be made after rebooting (block 804) into the main VM operating system (156-1, 156-2, 156-n).

FIG. 9 is a data flow diagram (900) depicting the process of customizing a VM (154-n), according to one example of the principles described herein. As depicted in FIG. 9, the input for the customization of the VM (154-n) is a SOS (902) and the response file (904) described above in connection with blocks 502 and 504 of FIG. 3, respectively. The SOS (902) is created by either building it or customizing a vendor-provided SOS. The response file (904) is created by storing external input in a text file and packaging the response file in, for example, the virtual floppy drives (164-1, 164-2, 164-n).

The SOS (902) is booted at 952 using a boot media (906) such as, for example, the ISO file to be used as CD backing as described above in connection with block 502 of FIG. 3. This creates an instance of the running SOS (908) in maintenance mode (910) on, for example, volatile memory (912).

The response file (904) is packaged at 954 in a storage device (914) such as, for example, the above described virtual floppy drive (164-1, 164-2, 164-n). The response file (904) is then delivered to a virtual storage device (916) within a non-volatile memory at 956. In one example, a virtual device is created as the temporary virtual storage device (916) at 956 by adding the storage device (914) in the non-volatile memory (918) as the temporary virtual storage device (916).

At 958, data from the virtual storage device (916) is used as input in conjunction with the running SOS (908) to begin the customization process (920) at 960 as described above in connection with FIG. 7. The customization process (920) accesses the virtual HD (162-1, 162-2, 162-n) and its offline VM operating system (156-1, 156-2, 156-n) represented by 922 in FIG. 9, in order to customize the VM operating system (156-1, 156-2, 156-n) according to the data contained within the virtual storage device (916). After the customization process (920) is finished, the SOS (902) is powered off at 962.

At 964, a customized VM (154-n) is ready, the virtual storage device (916) may be removed, and the customized VM (154-n) is powered on using its customized VM main operating system. In this manner, the system (100) creates a customized VM (154-n).

The above systems and methods do not require a knowledge of the format of the virtual HD (162-1, 162-2, 162-n). This allows for the customization of any VM operating system (156-1, 156-2, 156-n) as described above.

In one example, the customization agent (FIG. 3, 322) may operate as a daemon. A daemon is a computer program that runs as a background process, rather than being under the direct control of a user or administrator. In this example, the customization agent (FIG. 3, 322) provides the information otherwise provided within the response file (904) described above, and customizes the VMs (154-1, 154-2, 154-n) during a process running in the background of the system (100). In this example, the customization agent (FIG. 3, 322) is registered as a daemon that is started automatically upon startup of the SOS (FIG. 3, 320).

In one example, the methods described above may be accomplished by a computer program product comprising a computer readable storage medium having computer usable program code embodied therewith that, when executed by the processor (102) of the compute resources (101), or another processing device, performs the above methods. Specifically, the computer usable program code, when executed by a processor (102), causes the processor (102) to boot (FIG. 2, block 402) a VM (154-1, 154-2, 154-n) into a service operating system (SOS) (FIG. 3, 320), customize (FIG. 2, block 404) the main VM operating system (156-1, 156-2, 156-n), and reboot (FIG. 2, block 406) the VM (154-1, 154-2, 154-n) into the main VM operating system (156-1, 156-2, 156-n) of the VM (154-1, 154-2, 154-n) The method described in FIGS. 3, 4, 5, 6, and 8 may be used in conjunction with or in addition to the method of FIG. 2, and implemented as computer usable program code within the computer program product.

The specification and figures describe a method of creating a customized virtual machine. The specification and figures describe that the creation of a customized virtual machine may comprise, with a processor, booting a virtual machine into a service operating system, with an agent, customizing a main operating system while the virtual machine is in maintenance mode, and rebooting the virtual machine into the main operating system of the virtual machine These methods and systems for customized virtual machine creation may have a number of advantages, including: (1) providing a fully automated and scalable methods and systems for creating a customized VM; (2) the methods and systems are vendor independent and extensible; (3) the present systems and methods solve the problem of creating a brand new virtual computer system to be configured with static IP settings and installing an operating system on the VM; (4) platform oriented with clear separation of platform and application or user developed scripts; (5) virtualization vendor virtual disk format independent making the methods vendor and OS independent; (6) guest OS independent except where customizations require the knowledge of the guest OS; (7) user modifiable; and (8) compatible with market place style business models, among other advantages.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of guest customization, comprising:
   booting a virtual machine into a maintenance mode within a service operating system having customization agent to customize a main operating system, wherein the maintenance mode provides access to reconstituted file systems of the main operating system allowing contents of a hard disk to be altered without activating the main operating system or any applications present on the main operating system,
   executing the customization agent based on, in the reconstituted file system, a response file created by a response file creation module;
   implementing a number of customization commands via the customization agent including adding or removing files within the reconstituted file system;
   injecting main operating system or virtual machine agent startup scripts in the reconstituted file system to complete the customization once the virtual machine is rebooted into the main operating system.

2. The method of claim 1 wherein the service operating system and the virtual machine reside only in random access memory (RAM) and do not use contents of the hard disk.

3. The method of claim 1 further comprising providing the virtual machine with virtual resources by a virtual machine manager wherein the virtual resources may be modified dynamically to compensate for the changes in the operating environment of the virtual machine.

4. The method of claim 1, in which the service operating system is created by packaging the service operating system into an ISO image to create a bootable media.

5. The method of claim 1, in which the service operating system is custom built.

6. The method of claim 1, in which the service operating system is a vendor-provided service operating system and customized by a controller.

7. The method of claim 6, in which an application programming framework is embedded within the service operating system to provide access to persistent data of the main operating system.

8. The method of claim 6, in which the controller creates a new temporary virtual storage device or configures an existing virtual storage device to hold the response file.

9. The method of claim 1, in which the service operating system is dynamically constructed with customization settings embedded into an image of the service operating system.

10. The method of claim 1, in which booting the virtual machine into a service operating system further comprises altering the boot order of the virtual machine.

11. The method of claim 10, further comprising restoring the boot order after customizing the main operating system.

12. A system for guest customization, comprising:
    a processor;
    a data storage device communicatively coupled to the processor;
    a service operating system stored on the data storage device that, when executed by the processor, boots a virtual machine into maintenance mode;
    a response file creation module stored on the storage device that, when executed by the processor, creates a response file; and
    a customization agent embedded within the service operating system, in which the customization agent, when executed by the processor on its startup, automatically performs customizations based on the response file including at least one of adding or removing files within the data storage device and injecting main operating system or virtual machine agent startup scripts to complete customization once the virtual machine is rebooted into the main operating system.

13. The system of claim 12 wherein the service operating system and the virtual machine reside only in random access memory (RAM) and do not use contents of the data storage device.

14. The system of claim 12 further comprising a virtual machine manager to provide the virtual machine with virtual resources wherein the virtual resources may be modified dynamically to compensate for the changes in the operating environment of the virtual machine.

15. The system of claim 12, in which the service operating system is a vendor-provided service operating system and customized by the processor, and wherein an application programming framework is embedded within the service operating system to provide the processor access to persistent data of the main operating system.

16. The system of claim 12, wherein the processor is configurable to create a new temporary virtual storage device or to configure an existing virtual storage device to hold the response file.

17. A non-transitory computer readable storage medium for guest customization, comprising computer usable program code that when executed by a processor causes the processor to:
    boot a virtual machine into a service operating system; and
    customize a main operating system while the virtual machine is in maintenance mode in which the entire service operating system and all applications reside only in random access memory and do not use non-volatile forms of data storage devices, wherein the code to customize the main virtual operating system while the virtual machine is in maintenance mode causes the processor to:

perform the customizations based on a response file that includes a number of parameters of the virtual machine created by a response file creation module;

implement a number of customization commands via the customization agent while the virtual machine is in the maintenance mode; and inject main operating system or virtual machine agent startup scripts to complete the customization once the virtual machine is rebooted into the main operating system.

18. The computer readable storage medium of claim 17 further comprising computer usable program code when executed by the processor to operate a virtual machine manager to provide the virtual machine with virtual resources wherein the virtual resources may be modified dynamically to compensate for the changes in the operating environment of the virtual machine.

19. The computer readable storage medium of claim 17, in which the service operating system is a vendor-provided service operating system and customized by the processor, and in which an application programming framework is embedded within the service operating system to provide the processor access to persistent data of the main operating system.

20. The computer readable storage medium of claim 17, further comprising computer usable program code when executed by the processor to create a new temporary virtual storage device or to configure an existing virtual storage device to hold the response file.

\* \* \* \* \*